United States Patent
Nakamura et al.

(10) Patent No.: US 11,202,008 B2
(45) Date of Patent: Dec. 14, 2021

(54) HEAD MOUNTED DISPLAY HAVING A PLURALITY OF DISPLAY MODES

(71) Applicant: Sony Interactive Entertainment Inc., Tokyo (JP)

(72) Inventors: Yuji Nakamura, Tokyo (JP); Kuniaki Oe, Tokyo (JP)

(73) Assignee: Sony Interactive Entertainment Inc., Tokyo (JP)

( * ) Notice: Subject to any disclaimer, the term of this patent is extended or adjusted under 35 U.S.C. 154(b) by 0 days.

(21) Appl. No.: 16/782,212

(22) Filed: Feb. 5, 2020

(65) Prior Publication Data

US 2020/0177810 A1    Jun. 4, 2020

Related U.S. Application Data

(63) Continuation of application No. 15/754,362, filed as application No. PCT/JP2016/063862 on May 10, 2016, now Pat. No. 10,594,936.

(30) Foreign Application Priority Data

Sep. 25, 2015 (JP) ................................. 2015-188025

(51) Int. Cl.
| | |
|---|---|
| *H04N 5/232* | (2006.01) |
| *G06F 3/0484* | (2013.01) |
| *H04N 5/64* | (2006.01) |
| *G09G 5/00* | (2006.01) |
| *G06F 3/01* | (2006.01) |
| *G02B 27/01* | (2006.01) |

(52) U.S. Cl.
CPC ....... *H04N 5/23245* (2013.01); *G02B 27/017* (2013.01); *G02B 27/0172* (2013.01); *G06F 3/011* (2013.01); *G06F 3/0484* (2013.01);
*G09G 5/00* (2013.01); *H04N 5/64* (2013.01); *G02B 2027/014* (2013.01); *G02B 2027/0138* (2013.01)

(58) Field of Classification Search
CPC .................................................. H04N 5/23245
USPC ........................................................... 345/8
See application file for complete search history.

(56) References Cited

U.S. PATENT DOCUMENTS

| | | | |
|---|---|---|---|
| 9,024,872 B2 | 5/2015 | Kengo | |
| 2005/0248852 A1 | 11/2005 | Masafumi | |
| 2010/0079356 A1 | 4/2010 | Hoellwarth | |

(Continued)

FOREIGN PATENT DOCUMENTS

| | | |
|---|---|---|
| CN | 102221961 A | 10/2011 |
| CN | 103092695 A | 5/2013 |

(Continued)

OTHER PUBLICATIONS

International Search Report for corresponding PCT Application No. PCT/JP2016/063862, 4 pages, dated Jul. 26, 2016.

(Continued)

*Primary Examiner* — Long D Pham
(74) *Attorney, Agent, or Firm* — Matthew B. Dernier, Esq.

(57) ABSTRACT

Methods and apparatus provide for controlling an information processing apparatus that is connected to a video display apparatus worn on a head of a user, the method comprising: displaying a planar video on the video display apparatus in a display mode that changes a shape of the planar video as a function of a change in position and/or orientation of the video display apparatus.

15 Claims, 6 Drawing Sheets

(56) References Cited

U.S. PATENT DOCUMENTS

| | | |
|---|---|---|
| 2011/0267267 A1 | 11/2011 | Hasegawa |
| 2013/0111199 A1 | 5/2013 | Hiromitsu |
| 2013/0169765 A1 | 7/2013 | Jung-Jin |
| 2014/0055353 A1 | 2/2014 | Kengo |
| 2014/0368535 A1 | 12/2014 | Salter |
| 2015/0070247 A1 | 3/2015 | Shunichi |
| 2015/0103021 A1 | 4/2015 | Lim |
| 2015/0170422 A1* | 6/2015 | Aoyama ............. G02B 27/017 345/8 |
| 2016/0109703 A1 | 4/2016 | Nishizawa |
| 2016/0335801 A1 | 11/2016 | Yoon |
| 2017/0011555 A1* | 1/2017 | Li .......................... G06T 1/60 |

FOREIGN PATENT DOCUMENTS

| | | |
|---|---|---|
| CN | 103188506 A | 7/2013 |
| CN | 104205857 A | 12/2014 |
| JP | 07298165 A | 11/1995 |
| JP | 2003279882 A | 10/2003 |
| JP | 2005339266 A | 12/2005 |
| JP | 2009192905 A | 8/2009 |
| JP | 2011059435 A | 3/2011 |
| JP | 2012063253 A | 3/2012 |
| WO | 2012147702 A1 | 11/2012 |

OTHER PUBLICATIONS

International Preliminary Report on Patentability and Written Opinion for corresponding PCT Application No. PCT/JP2016/063862, 13 pages, dated Apr. 5, 2018.

Supplementary European Search Report for corresponding EP Application No. 16848354, 8 pages, dated Feb. 22, 2019.

Notification of Reasons for Refusal for corresponding JP Application No. 2019-018866, 12 pages, dated Nov. 19, 2019.

First Office Action for corresponding CN Application No. 201680053928.3, 18 pages, dated Jul. 3, 2020.

* cited by examiner

F I G . 1
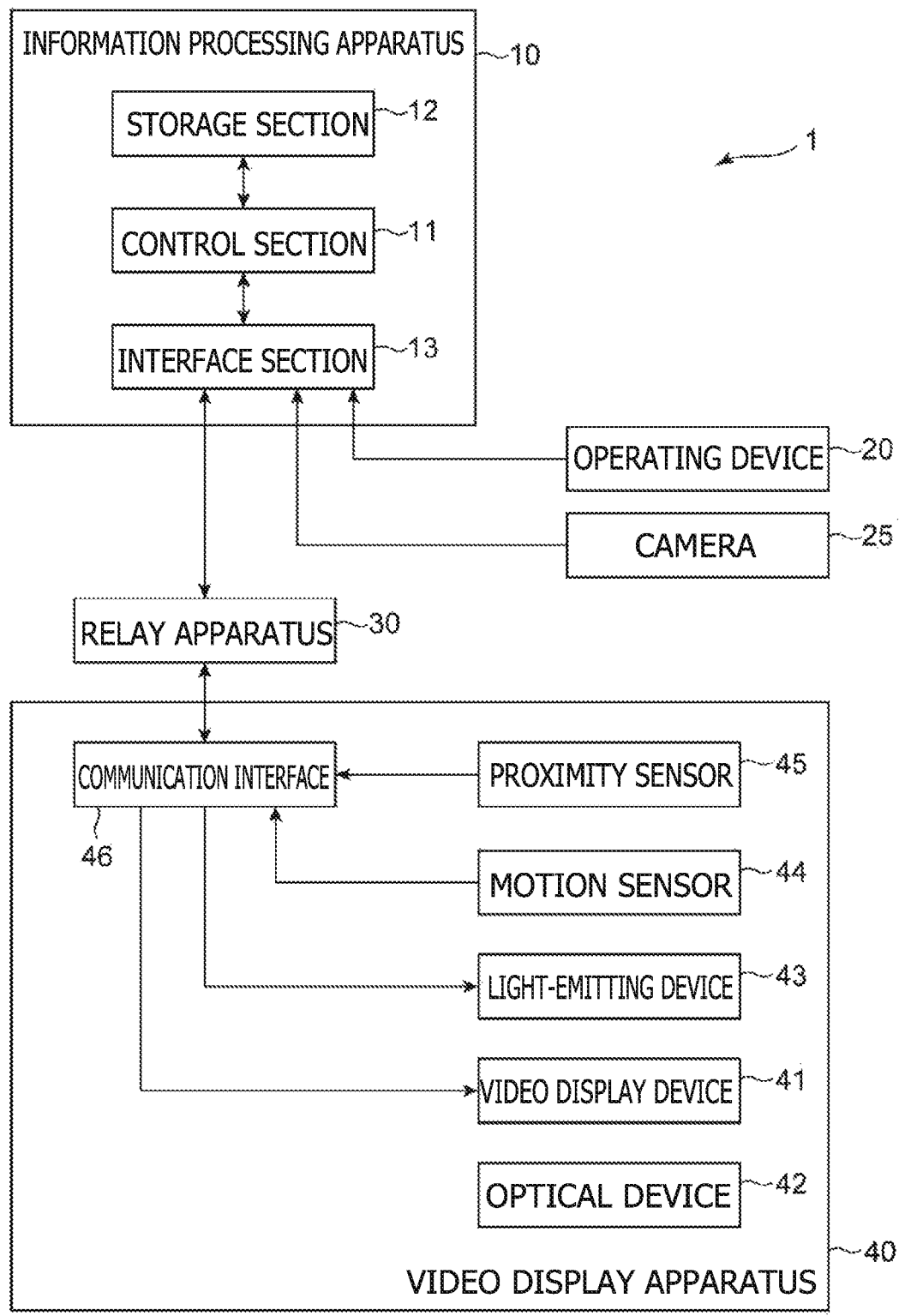

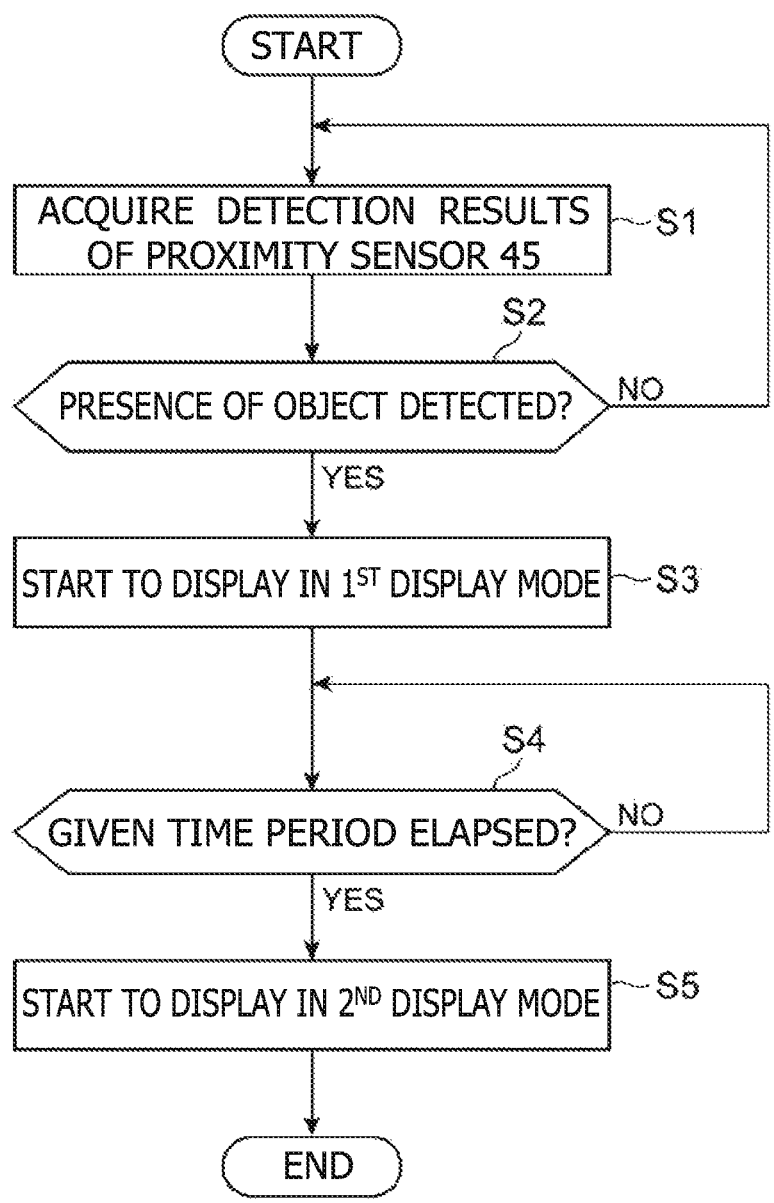

HEAD MOUNTED DISPLAY HAVING A PLURALITY OF DISPLAY MODES

CROSS REFERENCE TO RELATED APPLICATIONS

This application is a continuation of U.S. patent application Ser. No. 15/754,362, accorded a filing date of Feb. 22, 2018 (allowed), which is a National Stage application claiming priority to International Application No.: PCT/JP2016/063862, filed on May 10, 2016, which claims priority to JP 2015-188025, filed Sep. 25, 2015, the entire disclosures of which are hereby incorporated by reference.

TECHNICAL FIELD

The present invention relates to an information processing apparatus, a control method of a video display apparatus, and a program that display a video on a video display apparatus used by being worn on the head by a user.

BACKGROUND ART

Some video display apparatuses such as head-mounted displays are used by being worn on the head by users. A video display apparatus of this kind allows a user to view an image by forming the image in front of the user's eyes.

Some among the above video display apparatuses detect the user's head motion and display an image that is updated with change in position or orientation of the user's head. Such a video display apparatus allows viewing of videos that leave a user a "you are there" feeling, thereby finding application in virtual reality technology and so on. As an example, there is known a program that, while changing the orientation of a virtual camera placed in a virtual space to match with the user's head motion, displays a video indicating how the virtual space looks as seen from the virtual camera on a video display apparatus. This allows the user to view a video that leaves the user a sensation as if he or she were in a virtual space.

SUMMARY

Technical Problem

In the above video display apparatus, due consideration has not been given enough to how planar videos should be displayed (the same two-dimensional videos as displayed by conventional display apparatuses).

The present invention has been made in consideration of the above circumstances, and it is an object of the present invention to provide an information processing apparatus, a control method of a video display apparatus, and a program that can display a planar video in a manner suitable for circumstances of use when a planar video is displayed on the video display apparatus used by being worn on the head by a user.

Solution to Problem

An information processing apparatus according to the present invention is an information processing apparatus connected to a video display apparatus used by being worn on the head by a user. The information processing apparatus includes a first display control section, a second display control section, and a switching control section. The first display control section displays a planar video on the video display apparatus in a first display mode in which the planar video is displayed in the front direction of the user irrespective of the change in position and/or orientation of the video display apparatus. The second display control section displays a planar video on the video display apparatus in a second display mode in which the planar video is displayed in a manner that changes with the change in position and/or orientation of the video display apparatus. The switching control section switches between the first display mode and the second display mode based on a given condition.

Also, a control method of a video display apparatus according to the present invention is a control method of a video display apparatus used by being worn on the head by a user. The video display apparatus control method includes a step of displaying a planar video on the video display apparatus in a first display mode in which the planar video is displayed in the front direction of the user irrespective of the change in position and/or orientation of the video display apparatus, a step of displaying a planar video on the video display apparatus in a second display mode in which the planar video is displayed in a manner that changes with the change in position and/or orientation of the video display apparatus, and a step of switching between the first display mode and the second display mode based on a given condition.

Also, a program according to the present invention is a program causing a computer connected to a video display apparatus used by being worn on the head by a user to function as first display control means, second display control means, and switching control means. The first display control means displays a planar video on the video display apparatus in a first display mode in which the planar video is displayed in the front direction of the user irrespective of the change in position and/or orientation of the video display apparatus. The second display control means displays the planar video on the video display apparatus in a second display mode in which the planar video is displayed in a manner that changes with the change in position and/or orientation of the video display apparatus. The switching control means switches between the first display mode and the second display mode based on a given condition. This program may be provided stored in a computer-readable and non-temporary information storage medium.

BRIEF DESCRIPTION OF DRAWINGS

FIG. 1 is a configuration block diagram illustrating a configuration of a video display system including an information processing apparatus according to an embodiment of the present invention.

FIG. 7 is a flowchart illustrating an example of a processing flow carried out by the information processing apparatus according to the present embodiment.

DESCRIPTION OF EMBODIMENT

Figure 2:
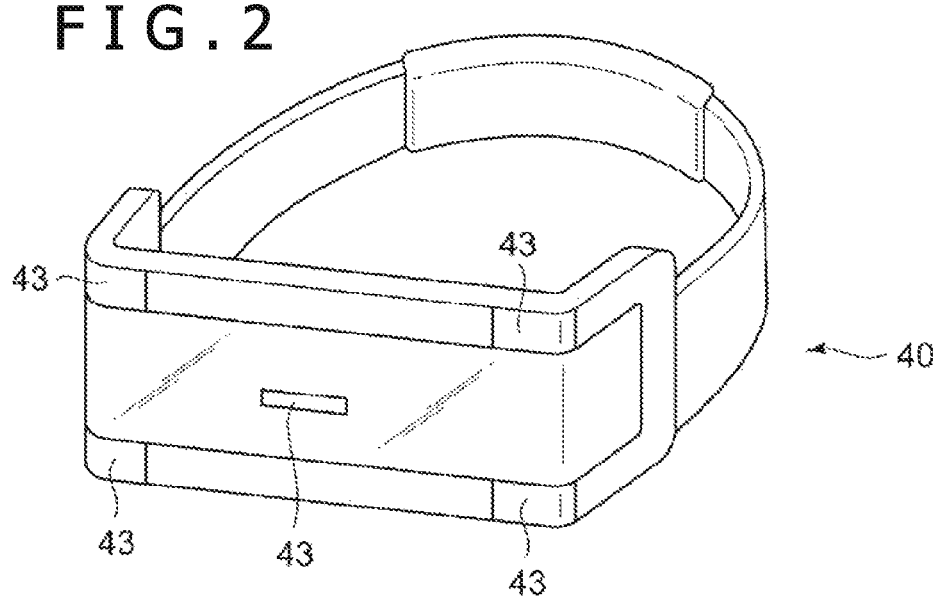
FIG. 2 is a front perspective view illustrating an example of appearance of a video display apparatus.

A detailed description will be given below of an embodiment of the present invention with reference to drawings.

FIG. 1 is a configuration block diagram illustrating a configuration of a video display system 1 including an information processing apparatus 10 according to an embodiment of the present invention. As illustrated in FIG. 1, the video display system 1 is configured to include the information processing apparatus 10, an operating device 20, a camera 25, a relay apparatus 30, and a video display apparatus 40.

The information processing apparatus 10 is an apparatus that supplies a video to be displayed by the video display apparatus 40 and may be, for example, a home gaming machine, a portable gaming machine, a personal computer, a smartphone, or a tablet. As illustrated in FIG. 1, the information processing apparatus 10 is configured to include a control section 11, a storage section 12, and an interface section 13.

The control section 11 includes at least a processor such as CPU (Central Processing Unit) and performs a variety of information processing tasks by executing a program stored in the storage section 12. It should be noted that a specific example of a process performed by the control section 11 in the present embodiment will be described later. The storage section 12 includes at least a memory device such as RAM (Random Access Memory) and stores a program executed by the control section 11 and data processed by the program.

The interface section 13 is an interface for data communication between the operating device 20, the camera 25, and the relay apparatus 30. The information processing apparatus 10 is connected to each of devices including the operating device 20, the camera 25, and the relay apparatus 30 via the interface section 13 in a wired or wireless fashion. Specifically, the interface section 13 may include a multimedia interface such as HDMI (High-Definition Multimedia Interface: registered trademark) to send video and audio, supplied by the information processing apparatus 10, to the relay apparatus 30. The interface section 13 also includes a data communication interface such as Bluetooth (registered trademark) or USB (Universal Serial Bus). The information processing apparatus 10 receives various information from the video display apparatus 40 by way of the relay apparatus 30 and sends control signals and so on via this data communication interface. The information processing apparatus 10 receives a signal indicating details of user operation input to the operating device 20 and image data captured by the camera 25 via this data communication interface.

The operating device 20 is a controller of home gaming machine or the like for the user to perform various operations and issue instructions to the information processing apparatus 10. Details of user operation input to the operating device 20 are sent to the information processing apparatus 10 in a wired or wireless fashion. It should be noted that the operating device 20 may include operating buttons, touch panel, and so on placed on the front face of the housing of the information processing apparatus 10. The camera 25 is installed on the front of the user using the present video display system 1 and captures a video including the video display apparatus 40 worn by the user.

The relay apparatus 30 is connected to the video display apparatus 40 in a wired or wireless fashion, accepts video data supplied from the information processing apparatus 10, and outputs the video signal that matches with the accepted data to the video display apparatus 40. At this time, the relay apparatus 30 may perform, as occasion demands, a correction process that cancels out distortion that occurs in optics of the video display apparatus 40 for the supplied video data and output a corrected video signal. It should be noted that the video signal supplied from the relay apparatus 30 to the video display apparatus 40 includes two videos, one for left eye and another for right eye. The relay apparatus 30 also relays various information exchanged between the information processing apparatus 10 and the video display apparatus 40 such as audio data and control signals in addition to video data.

Figure 3:
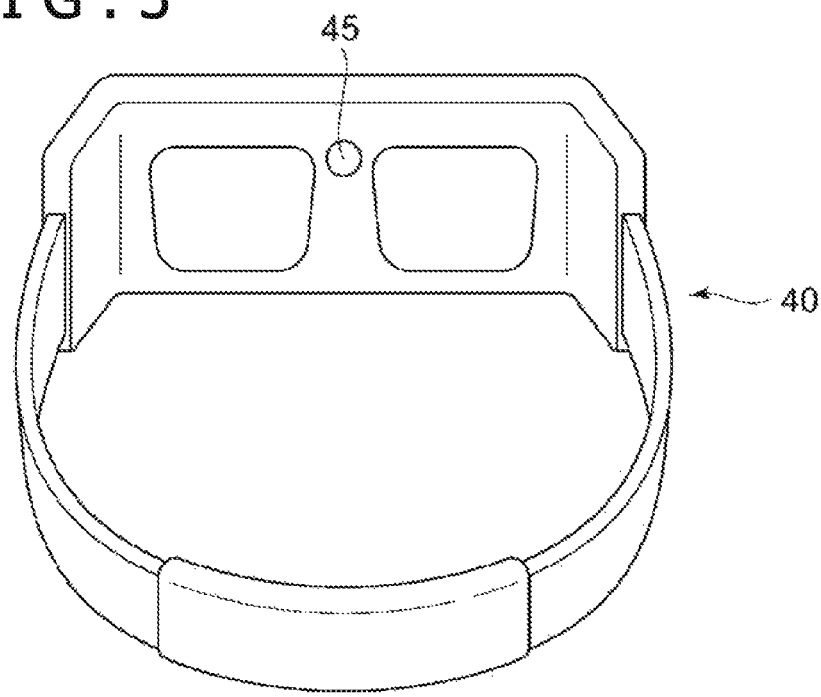
FIG. 3 is a rear perspective view illustrating an example of appearance of the video display apparatus.

The video display apparatus 40 displays a video that matches with the video signal input from the relay apparatus 30 and allows the user to view the video. The video display apparatus 40 is a video display apparatus used by being worn on the head by the user and supports video viewing with both eyes. That is, the video display apparatus 40 forms a video in front of each of the right and left eyes of the user. The video display apparatus 40 is also configured to be able to display a stereoscopic video using binocular parallax. As illustrated in FIG. 1, the video display apparatus 40 is configured to include a video display device 41, an optical device 42, a light-emitting device 43, a motion sensor 44, a proximity sensor 45, and a communication interface 46. Further, FIGS. 2 and 3 illustrate appearance of the video display apparatus 40, and FIG. 2 is a perspective view as seen from the front, and FIG. 3 is a perspective view as seen from the rear.

The video display device 41 is, for example, an organic EL (Electroluminescence) display panel or liquid crystal display panel and displays a video that matches with the video signal supplied from the relay apparatus 30. The video display device 41 displays two videos, one for left eye and another for right eye. It should be noted that the video display device 41 may be a single display device that displays videos for left and right eyes side by side or may include two display devices each of which independently displays a video. Alternatively, a known smartphone or other device may be used as the video display device 41.

The optical device 42 is, for example, a hologram, a prism, or a half-mirror and placed in front of the user's eyes to transmit or refract light of the videos displayed by the video display device 41 so that the light enters each of the left and right eyes of the user. Specifically, a video for left eye displayed by the video display device 41 enters the user's left eye by way of the optical device 42, and a video for right eye enters the user's right eye by way of the optical device 42. This allows the user to view the video for left eye with his or her left eye and the video for right eye with his or her right eye while wearing the video display apparatus 40 on the head. It should be noted that, in the present embodiment, we assume that the video display apparatus 40 is a non-see-through video display apparatus that does not allow the user to visually recognize the outside scene.

The light-emitting device 43 is, for example, an LED (Light Emitting Diode), is placed on the front of the video display apparatus 40, and emits light in response to an instruction from the information processing apparatus 10. The information processing apparatus 10 can identify the position of the video display apparatus 40 in the field of view of the camera 25 by imaging light of the light-emitting device 43 with the camera 25. That is, the information processing apparatus 10 can track the change in position and tilt of the video display apparatus 40 using light of the light-emitting device 43. It should be noted that, as illustrated in FIG. 2, the plurality of light-emitting devices 43 are provided in the present embodiment.

The motion sensor 44 measures various information about the position, orientation, and motion of the video display apparatus 40. For example, the motion sensor 44 may include an acceleration sensor, a gyroscope, or a geomagnetic sensor. Measurement results of the motion sensor 44 are sent to the information processing apparatus 10 by way of the relay apparatus 30. The information processing apparatus 10 can use measurement results of the motion sensor 44 to identify the change in motion and orientation of the video display apparatus 40. Specifically, the information processing apparatus 10 can detect the tilt and translation of the video display apparatus 40 relative to the vertical direction by using measurement results of the acceleration sensor. The information processing apparatus 10 can also detect the rotational motion of the video display apparatus 40 by using measurement results of a gyroscope or a geomagnetic sensor.

The proximity sensor 45 is a sensor that detects, in a noncontact fashion, the presence of an object when the object approaches a target detection range near the sensor. The proximity sensor 45 may be of any type such as infrared sensor, for example. As illustrated in FIG. 3, the proximity sensor 45 is placed approximately at the center on the rear face of a main body portion of the video display apparatus 40. This allows the proximity sensor 45 to detect the approaching forehead of the user when the user attempts to put on the video display apparatus 40 on the head. The information processing apparatus 10 can detect the user's putting on the video display apparatus 40 or taking it off from the head by using measurement results of the proximity sensor 45.

The communication interface 46 is an interface for carrying out data communication with the relay apparatus 30. For example, when the video display apparatus 40 sends or receives data to or from the relay apparatus 30 by wireless communication such as wireless LAN (Local Area Network) or Bluetooth, the communication interface 46 includes a communication antenna and a communication module. The communication interface 46 may also include a communication interface such as HDMI or USB to carry out data communication with the relay apparatus 30 in a wired manner.

Figure 4:
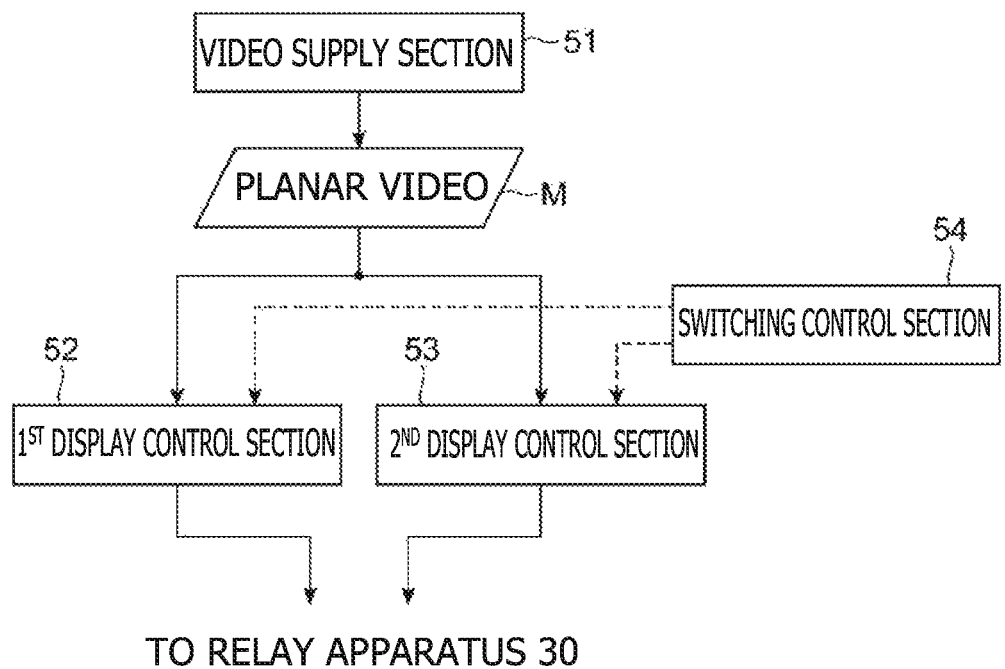
FIG. 4 is a functional block diagram illustrating functions of the information processing apparatus according to the present embodiment.

A description will be given next of the functions realized by the information processing apparatus 10 using FIG. 4. As illustrated in FIG. 4, the information processing apparatus 10 functionally includes a video supply section 51, a first display control section 52, a second display control section 53, and a switching control section 54. These functions are realized as a result of execution of a program stored in the storage section 12 by the control section 11. This program may be provided to the information processing apparatus 10 via a communication network such as the Internet or may be provided stored in a computer-readable information storage medium such as optical disc.

The video supply section 51 supplies a video to be displayed by the video display apparatus 40. In the present embodiment, we assume that the video supply section 51 supplies a planar video (2D video) M as a video to be displayed. It should be noted that the video supply section 51 may supply not only the planar video M but also a stereoscopically viewable stereoscopic video using parallax to the video display apparatus 40.

Specifically, for example, the video supply section 51 may be realized as a result of execution of an application program of a game by the control section 11. In this case, the video supply section 51 supplies, as the planar video M, a game image indicating the state of progress of the game. The video supply section 51 may also be a rendering engine that reads video data such as movies stored on an information storage medium such as optical disc or hard disk and renders the video data.

Both of the first and second display control sections 52 and 53 realize display control for causing the video display apparatus 40 to display the planar video M supplied by the video supply section 51 by outputting the planar video M to the relay apparatus 30. It should be noted, however, that the first and second display control sections 52 and 53 cause the video display apparatus 40 to display the planar video M in different ways. In the description given below, the display mode realized by the first display control section 52 will be referred to as a first display mode, and the display mode realized by the second display control section 53 will be referred to as a second display mode. Also, a video including the planar video M and to be output to the relay apparatus 30 by each of the first and second display control sections 52 and 53 will be referred to as a display video.

The first display mode is a display mode for displaying the planar video M in the front direction of the user irrespective of the change in position and/or orientation of the video display apparatus 40. In the first display mode, the planar video M is always displayed in the display area of the video display apparatus 40 irrespective of the change in position and orientation of the video display apparatus 40. Specifically, the first display control section 52 generates videos for right and left eyes in which the video supplied by the video supply section 51 is placed at a given position in the approximate center. Then, the two generated videos are output to the relay apparatus 30 as display videos. As a result, while the videos are displayed in the first display mode, the display position of the planar video M in the display area of the video display apparatus 40 remains unchanged so that the planar video M is always displayed in the front direction as seen from the user. That is, while the videos are displayed in the first display mode, the planar video M will never move outside the display area of the video display apparatus 40. Because the video display apparatus 40 is secured to the user's head, the user feels as if the screen displaying the planar video M is moving in step with his or her own motion when the user moves his or her own head to change the face position and orientation.

The second display mode is a display mode for displaying the planar video M in a manner that changes with the change in position and/or orientation of the video display apparatus 40. In the second display mode, the display position of the planar video M in the display area of the video display apparatus 40 changes with movement of the video display apparatus 40. Specifically, the second display control section 53 controls the display position of the planar video M such that the display position of the planar video M is fixed in place in a virtual space. In the second display mode, therefore, when the user significantly moves his or her head, the planar video M may move outside the display area of the video display apparatus 40, possibly resulting in the planar video M not being displayed. In such a case, the second display control section 53 may include, for example, a marker image indicating a direction in the display video to inform the user in which direction he or she should point his or her face so as to display the planar video M again.

Figure 5:
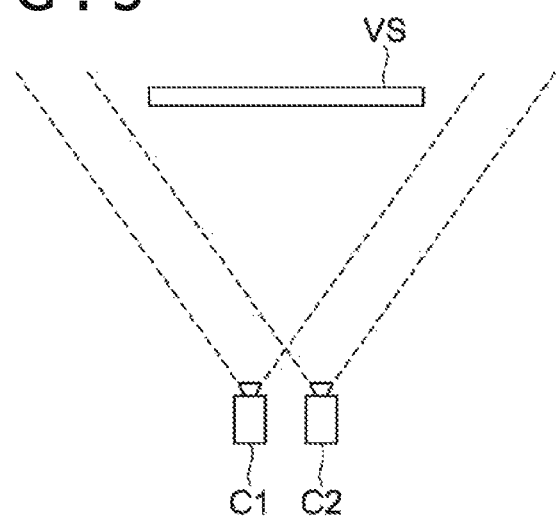
FIG. 5 is a diagram describing a specific example of a drawing process in a second display mode.

FIG. 5 is a diagram describing a specific example of a drawing process of the display video in the second display mode. This diagram illustrates a virtual space with a virtual screen VS and two viewpoint cameras C1 and C2 placed therein as seen from above. As illustrated in FIG. 5, the second display control section 53 has the virtual screen VS placed in the virtual space and the two viewpoint cameras C1 and C2 placed at a position opposed to the virtual screen VS. The two viewpoint cameras C1 and C2 are horizontally arranged side by side and at a given distance from each other. Then, the planar video M supplied by the video supply section 51 is attached to the front face of the virtual screen VS as texture. In this state, the second display control section 53 generates a video for left eye by drawing an image indicating how the inside of the virtual space looks as seen from the viewpoint camera C1. The second display control section 53 also generates a video for right eye by drawing an image indicating how the inside of the virtual space looks as seen from the viewpoint camera C2. As the video display apparatus 40 displays display videos generated as described above, the user can view the planar video M appearing on the virtual screen VS that is located at a position in front of and at a distance from the user.

Further, the second display control section 53 changes the orientation of the two viewpoint cameras C1 and C2 (line-of-sight direction) with change in orientation of the video display apparatus 40. Here, the orientation of the video display apparatus 40 may be defined, for example, by rotational angles (e.g., yaw, pitch, and roll angles) about rotational axes that run along the vertical, horizontal, and longitudinal directions of the video display apparatus 40, respectively. The second display control section 53 changes the position of the two viewpoint cameras C1 and C2 in response to translation of the video display apparatus 40. As described earlier, the second display control section 53 can identify the change in position and orientation of the video display apparatus 40 by using measurement results of the motion sensor 44 and detecting the position of light of the light-emitting device 43 from the image captured by the camera 25. The second display control section 53 changes the position and orientation of the viewpoint cameras C1 and C2 with change in position and orientation of the video display apparatus 40 identified in this manner.

Specifically, when the orientation of the video display apparatus 40 changes, the second display control section 53 rotates the viewpoint cameras C1 and C2 in the same rotational direction as that rotation and by the same amount of rotation. At this time, the viewpoint cameras C1 and C2 rotate in the virtual space about the center position between the two as a rotational axis while maintaining a distance from each other. Also, when the video display apparatus 40 translates from a relative position, the second display control section 53 moves both the viewpoint cameras C1 and C2 in the virtual space in response to the direction of motion and the travel thereof. Then, the second display control section 53 also generates videos for left and right eyes by drawing how the virtual screen VS looks as seen from the viewpoint cameras C1 and C2 whose position and orientation have been changed. At this time, the position and orientation of the viewpoint cameras change, but the position of the virtual screen VS in the virtual space remains unchanged. This allows the user to experience a sensation as if the screen indicating the planar video M were actually fixed in the air while viewing the planar video M. Further, the user can view the planar video M while focusing attention on what appears in the area near the perimeter which is difficult to visually recognize in the initial condition by changing the orientation and position of his or her face such that the area near the perimeter of the planar video M is located at the center of the field of view, for example.

It should be noted that although, here, the display videos are updated with change in both orientation and position of the video display apparatus 40, the second display control section 53 may change the display videos only with change in orientation or position of the video display apparatus 40. Also, in the above description, planar display videos were generated by drawing how the virtual screen VS placed in a virtual 3D space looked as seen from the two viewpoint cameras. However, the display video drawing process is not limited to such a method, and the second display control section 53 may generate display videos by 2D image processing. For example, the second display control section 53 determines the position where the planar video M is placed in the display video in response to the change in position of the video display apparatus 40 and draws videos for left and right eyes, each with the planar video M placed at the determined position. At this time, the second display control section 53 changes the position of the planar video M in the display video such that the video display apparatus 40 moves in the opposite direction to the direction of movement of the video display apparatus 40. This allows the user to feel as if the planar video M remained at the original position even if the user moves his or her head. Further, the second display control section 53 may change the display position of the planar video M in response to the change in orientation of the video display apparatus 40 and change the shape of the planar video M, for example, through projective transformation. According to such control, it is possible to display the planar video M in the second display mode without carrying out 3D-based image processing.

Figure 6A:
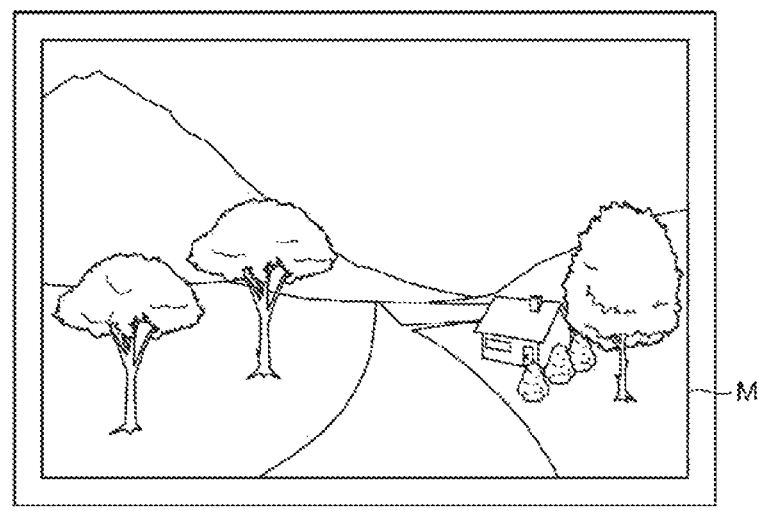
FIG. 6A is a diagram illustrating a display example in an initial state of first and second display modes.
Figure 6B:
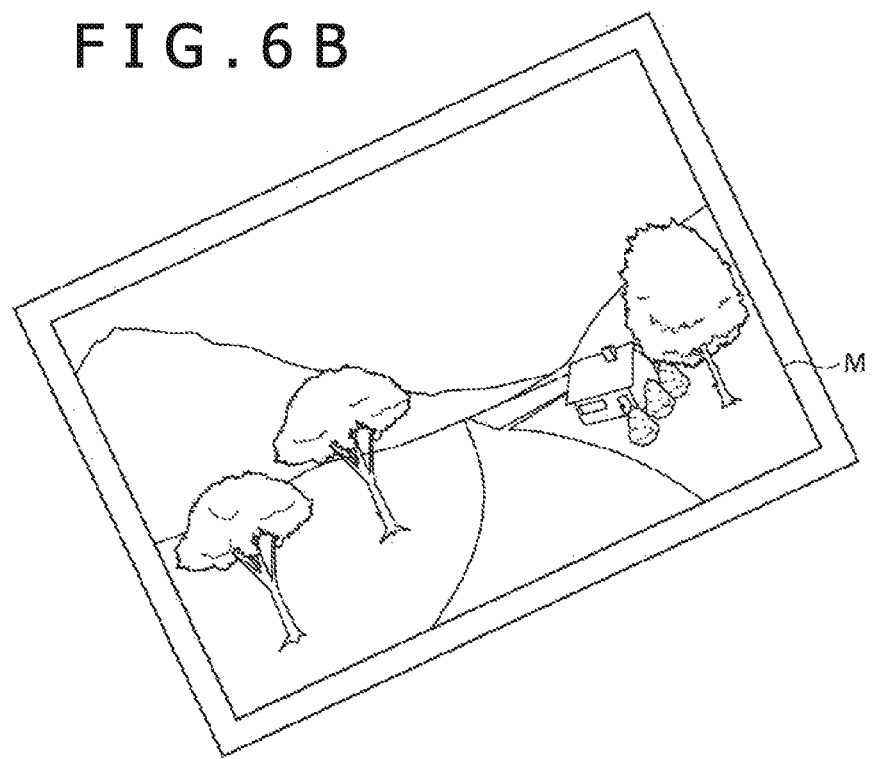
FIG. 6B is a diagram illustrating a display example of the first display mode.
Figure 6C:
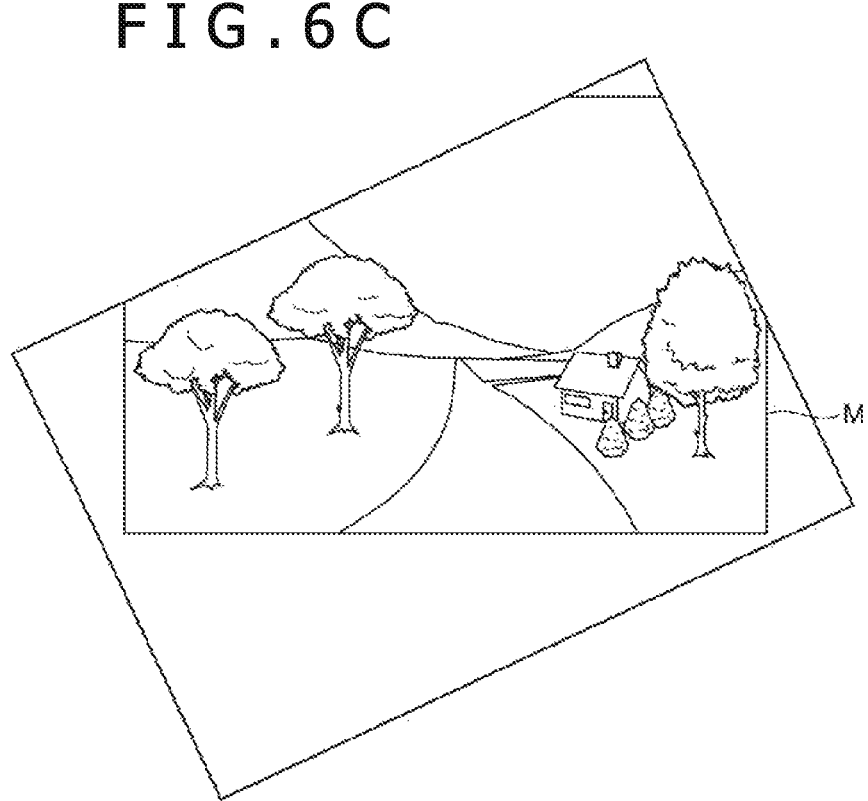
FIG. 6C is a diagram illustrating a display example of the second display mode.

FIGS. 6A to 6C are diagrams describing the difference in display between the first and second display modes. FIG. 6A illustrates an example of display in an initial state (state in which the display of the planar video M begins). In the initial state, the display is the similar in the first and second display modes. In contrast, FIGS. 6B and 6C illustrate an example of display when the user tilts his or her head from the state depicted in FIG. 6A. FIGS. 6B and 6C illustrate an example of display in the first display mode and an example of display in the second display mode, respectively. In the first display mode, even when the user tilts his or her head, the display position of the planar video M in the display area of the video display apparatus 40 remains unchanged. For this reason, when the user tilts his or her head, it looks as if the planar video M were also tilted in response thereto. In contrast, in the second display mode, the display position of the planar video M in the virtual space is controlled such that the position remains unchanged as described earlier irrespective of the movement of the user's face. Therefore, when the user tilts his or her head, the display position of the planar video M in the display area of the video display apparatus 40 rotates as illustrated in FIG. 6C. As a result, it looks as if the planar video M maintained the same orientation as in FIG. 6A as seen from the user.

The switching control section 54 performs display switching control for switching between the first and second display modes that have been described up to this point based on a given condition. In the present embodiment in particular, the switching control section 54 may switch the display mode in response to a direct instruction input to the operating device 20 from the user but may also switch the display mode based on various other conditions. A description will be given below of several specific examples of conditions for the switching control section 54 to switch the display mode.

First, as a first example of a switching condition, an example of switching the display mode in accordance with the display size of the planar video M will be described. In this example, the display size of the planar video M may be switched in accordance with an instruction input to the operating device 20 from the user or may be switched by a control input from the video supply section 51 that supplies the planar video M. Also, the default display size may be specified in advance by the user.

In this example, the switching control section 54 determines in which display mode, the first or second display mode, the planar video M is to be displayed in response to the display size of the planar video M to be displayed from now at a time when the display of the planar video M begins or when the display size of the planar video M is changed. Then, the switching control section 54 instructs the first display control section 52 or the second display control section 53 to display the planar video M in the determined display mode.

More specifically, the switching control section 54 selects the second display mode when the planar video M should be displayed in a display size equal to a given threshold or more. Conversely, the switching control section 54 selects the first display mode when the planar video M should be displayed in a display size less than the given threshold. A large display size may result in the planar video M failing to fit into the display area of the video display apparatus 40. Further, the planar video M equal to or smaller than the display area may lead to distortion in the displayed image at a position near the perimeter of the display area, resulting in difficulty for the user to visually recognize the image near the perimeter. For this reason, when the display size is equal to a given threshold or more, the planar video M is displayed in the second display mode. In the second display mode, the position and orientation of the viewpoint cameras change in accordance with the movement of the user's head. For this reason, the user can view the planar video M in a manner that permits easy viewing of the area near the perimeter by moving the area near the perimeter of the planar video M to somewhere near the center of the display area of the video display apparatus 40. Conversely, when the display size of the planar video M is small, the user can view the entire planar video M without moving the viewpoint. Therefore, the user can always view the entire planar video M by displaying the planar video M in the first display mode for displaying the planar video M in the front direction of the user.

A description will be given next of display switching control performed when the user begins to use the video display apparatus 40 as a second example of a switching condition. In this second example, the information processing apparatus 10 detects the user's attempt to start using the video display apparatus 40 based on detection results of the proximity sensor 45. Then, when the user starts using the video display apparatus 40, the information processing apparatus 10 displays the planar video M including a startup message or a system menu, for example, on the video display apparatus 40.

In this example, the switching control section 54 instructs the first display control section 52 to display the planar video M in the first display mode at a time when the proximity sensor 45 detects the presence of an object for the first time. Then, when a given time period elapses from the detection of presence of an object by the proximity sensor 45 for the first time, the switching control section 54 instructs the second display control section 53 to switch to the second display mode. Such switching control is performed for the following reason. That is, when the proximity sensor 45 detects the presence of an object for the first time, it is highly likely that the user has yet to wear the video display apparatus 40 at its correct position and is still in the middle of putting on the video display apparatus 40. Therefore, it is not preferred to finalize the display position of the planar video M immediately when the proximity sensor 45 detects the presence of an object. On the other hand, if nothing is displayed while the user is attempting to put on the video display apparatus 40, it will become difficult to adjust the position of the video display apparatus 40 when the user puts on the video display apparatus 40. For this reason, in the second example, the planar video M is displayed in the first display mode first when the user begins to put on the video display apparatus 40. In the first display mode, the planar video M is always displayed approximately at the center of the display area of the video display apparatus 40. As a result, even if the user moves his or her head while putting on the video display apparatus 40, the display position in the display area of the planar video M remains unchanged. This allows the user to adjust the position of the video display apparatus 40 such that the planar video M is located at an easy-to-see position. Thereafter, the display mode is switched to the second display mode at a time when the user is probably finished with putting on the video display apparatus 40, making it possible to control the display position of the planar video M relative to the position of the video display apparatus 40 at that time.

A description will be given here of an example of a processing flow performed by the information processing apparatus 10 in this second example with reference to the flowchart depicted in FIG. 7. In the state where the video display apparatus 40 is not used, the switching control section 54 acquires detection results of the proximity sensor 45 on a regular basis (S1) and verifies whether the presence of an object has not been detected (S2). When the presence of an object is detected in S2, it is probable that the user is beginning to use the information processing apparatus 10. Therefore, the switching control section 54 instructs the first display control section 52 to initiate the display in the first display mode. As a result, the first display control section 52 initiates a process of displaying the planar video M such as system menu in the first display mode (S3).

Thereafter, the switching control section 54 counts the elapsed time from the start of the planar video M display process in S3 and determines whether a given time period has elapsed (S4). When the given time period has elapsed, the switching control section 54 instructs the second display control section 53 to initiate the display in the second display mode. As a result, the second display control section 53 initiates a process of displaying the planar video M that has been displayed in the first display mode up to that time in the second display mode (S5).

At this time, the second display control section 53 generates a display video by using, as a reference posture of the video display apparatus 40, the position and orientation of the video display apparatus 40 at the time when the display process in S5 was initiated. That is, the position and orientation of the video display apparatus 40 at the time of switching from the first display mode to the second display mode are associated with the initial position and line-of-sight direction of the viewpoint cameras in the virtual space, and the virtual screen VS is placed at the front in the line-of-sight direction of the viewpoint cameras. As a result, when the second display mode is initiated, the planar video M is displayed in the front direction of the user as in the first display mode. Thereafter, as the position and orientation of the video display apparatus 40 change, the position and line of sight of the viewpoint cameras will change in response to the change. As a result, assuming that the state after the elapse of a given time period from when the user begins to wear the video display apparatus 40 (i.e., state in which the user is probably finished with putting on the video display apparatus 40) is a reference state, it is possible to fix the virtual screen VS in place in the front direction of the user in this reference state.

Also, in the second example, the first display control section 52 may include, in the display video, a notification video for informing the user of time remaining until the first display mode is switched to the second display mode. The notification video in this case may be, for example, a time counter directly indicating, in number form, elapsed time from the start of the display in the first display mode and time remaining until the display mode will be switched and a gauge image visually indicating elapsed time.

The first and second examples described above may be used in combination. Specifically, if the display size of the planar video M is equal to a given threshold or more, the switching control section 54 displays the planar video M in the first display mode at a time when the proximity sensor 45 detects the presence of an object for the first time and switches the display mode to the second display mode when a given time period elapses as described in the second example. On the other hand, if the display size of the planar video M is less than the given threshold, such switching is not performed, and the switching control section 54 continues to display the planar video M in the first display mode.

It should be noted that the condition for triggering the switching between the display modes by the switching control section 54 is not limited to those described above. For example, the switching control section 54 may switch the display mode in response to an express instruction from the video supply section 51. The video supply section 51 instructs the switching control section 54 to switch between the first and second display modes, for example, in accordance with the nature of content included in the planar video. This makes it possible to display the planar video M in the display mode appropriate for details of content to be displayed.

The information processing apparatus 10 according to the present embodiment described above makes it possible to display the planar video M in the display mode appropriate for user's circumstances of use and details of content by switching between the first and second display modes in accordance with various conditions.

It should be noted that embodiments of the present invention are not limited to that described above. For example, although the first display control section 52 generated videos for left and right eyes by itself in the above description, the present invention is not limited thereto, and the first display control section 52 may output the planar video M supplied by the video supply section 51 to the relay apparatus 30 in an 'as-is' manner as a display video. In this case, the relay apparatus 30 or the video display apparatus 40 generates videos for left and right eyes having the supplied planar video M placed approximately at the center. According to such a method, the relay apparatus 30 or the video display apparatus 40 can accept a video signal including the normal planar video M supplied by a conventional information processing apparatus and display the signal on the video display device 41.

Also, the first display control section 52 may generate a display video for the first display mode by using a process similar to generation of a display video for the second display mode by the second display control section 53. Specifically, the first display control section 52 may place the virtual screen VS and the viewpoint cameras C1 and C2 in a virtual space and generate a video indicating how the virtual screen VS looks as seen from each of the viewpoint cameras C1 as the display video. In this case, the first display control section 52 can maintain the position of the planar video M unchanged in the display video by keeping the position of the viewpoint cameras C1 and C2 fixed in place at all times irrespective of the change in position and orientation of the video display apparatus 40. Such control makes it possible to supply a display video to the relay apparatus 30 as a video signal in the similar format generated by the similar procedure without switching the drawing process between the first and second display modes.

Also, part or whole of the processes performed by the information processing apparatus 10 in the above description may be realized by the relay apparatus 30. In this case, the system as a whole including the information processing apparatus 10 and the relay apparatus 30 or the relay apparatus 30 alone functions as the information processing apparatus according to the present invention.

REFERENCE SIGNS LIST

1: Video display system, 10: Information processing apparatus, 11: Control section, 12: Storage section, 13: Interface section, 20: Operating device, 25: Camera, 30: Relay apparatus, 40: Video display apparatus, 41: Video display device, 42: Optical device, 43: Light-emitting device, 44: Motion sensor, 45: Proximity sensor, 46: Communication interface, 51: Video supply section, 52: First display control section, 53: Second display control section, 54: Switching control section

The invention claimed is:

1. An information processing apparatus adapted to be connected to a video display apparatus worn on a head of a user, the information processing apparatus comprising:
    a video supplier configured to produce a planar video representing virtual objects in a virtual world, wherein the planar video includes characteristics that require the video display apparatus to be a non-see-through video display apparatus that does not allow the user to visually recognize real world objects outside the virtual world; and
    a display controller configured to display the planar video on the video display apparatus in a display mode that changes a shape of the planar video as a function of a change in position and/or orientation of the video display apparatus, wherein the change in the shape of the planar video includes presenting the planar video in an orientation other than a front direction of the user.

2. The information processing apparatus of claim 1, wherein the display controller changes the shape of the planar video through projective transformation.

3. The information processing apparatus of claim 1, further comprising an operating device, including touch panel, that issues instructions to the information processing apparatus to change a display size of the planar video.

4. The information processing apparatus of claim 1, wherein the planar video is a system menu.

5. The information processing apparatus of claim 1, wherein the display controller displays a marker image to the user indicating a change posture of the user.

6. The information processing apparatus of claim 5, wherein the marker image indicates a direction.

7. The information processing apparatus of claim 1, further comprising:

another display controller configured to display the planar video on the video display apparatus in another display mode in which the planar video is displayed in a front direction of the user irrespective of the change in position and/or orientation of the video display apparatus; and a switching control section controller configured to switch between the display mode and the other display mode based on a given condition.

8. A method of controlling an information processing apparatus that is connected to a video display apparatus worn on a head of a user, the method comprising:

producing a planar video representing virtual objects in a virtual world, wherein the planar video includes characteristics that require the video display apparatus to be a non-see-through video display apparatus that does not allow the user to visually recognize real world objects outside the virtual world; and displaying the planar video on the video display apparatus in a display mode that changes a shape of the planar video as a function of a change in position and/or orientation of the video display apparatus, wherein the change in the shape of the planar video includes presenting the planar video in an orientation other than a front direction of the user.

9. The method of claim 8, wherein the displaying includes changing the shape of the planar video through projective transformation.

10. The method of claim 8, further comprising issuing instructions from an operating device, including touch panel, to the information processing apparatus to change a display size of the planar video.

11. The method of claim 8, wherein the planar video is a system menu.

12. The method of claim 8, wherein the displaying includes displaying a marker image to the user indicating a change posture of the user.

13. The method of claim 12, wherein the marker image indicates a direction.

14. The method of claim 8, further comprising:

displaying the planar video on the video display apparatus in another display mode in which the planar video is displayed in a front direction of the user irrespective of the change in position and/or orientation of the video display apparatus; and switching between the display mode and the other display mode based on a given condition.

15. A non-transitory, computer readable storage medium containing a computer program, which when executed by a computer, causes the computer to carry out actions for controlling an information processing apparatus that is connected to a video display apparatus worn on a head of a user, the actions comprising:

producing a planar video representing virtual objects in a virtual world, wherein the planar video includes characteristics that require the video display apparatus to be a non-see-through video display apparatus that does not allow the user to visually recognize real world objects outside the virtual world; and displaying the planar video on the video display apparatus in a display mode that changes a shape of the planar video as a function of a change in position and/or orientation of the video display apparatus, wherein the change in the shape of the planar video includes presenting the planar video in an orientation other than a front direction of the user.

* * * * *